United States Patent [19]
Schleede

[11] 3,978,673
[45] Sept. 7, 1976

[54] METHOD OF DISPOSING OF LIQUID WASTE

[75] Inventor: Stephen C. Schleede, Hinsdale, Ill.

[73] Assignee: A & H Engineering Corporation, Hinsdale, Ill.

[22] Filed: Apr. 21, 1975

[21] Appl. No.: 569,694

[52] U.S. Cl. .................................... 61/35; 111/7
[51] Int. Cl.² ........................................... E02D 3/10
[58] Field of Search ............... 61/35; 111/7; 47/58; 210/170; 172/1

[56] References Cited
UNITED STATES PATENTS

| | | | |
|---|---|---|---|
| 3,511,056 | 5/1970 | Jones et al. | 61/35 |
| 3,732,697 | 5/1973 | Dickson | 61/35 |

*Primary Examiner*—Jacob Shapiro
*Attorney, Agent, or Firm*—Marvin B. Eickenroht; W. F. Hyer

[57] ABSTRACT

A method is provided which permits incorporating large quantities of pumpable liquid wastes in the form of sludges, slimes and slurries, in the surface of the earth. The method involves the steps of continuously excavating earth from one region and transporting it to and depositing it at another region and thereafter depositing the liquid waste on the earthen material. The earth is initially excavated to depths which substantially exceed the normal agricultural tillage depths, i.e. to depths of the order of at least six feet, by digging the earth from one side of a trench and then transporting it and depositing it at the other side of the trench after which the waste liquid is deposited on the earthen material so transported. This permits very large quantities of liquid waste to be incorporated in a relatively small surface area.

4 Claims, 1 Drawing Figure

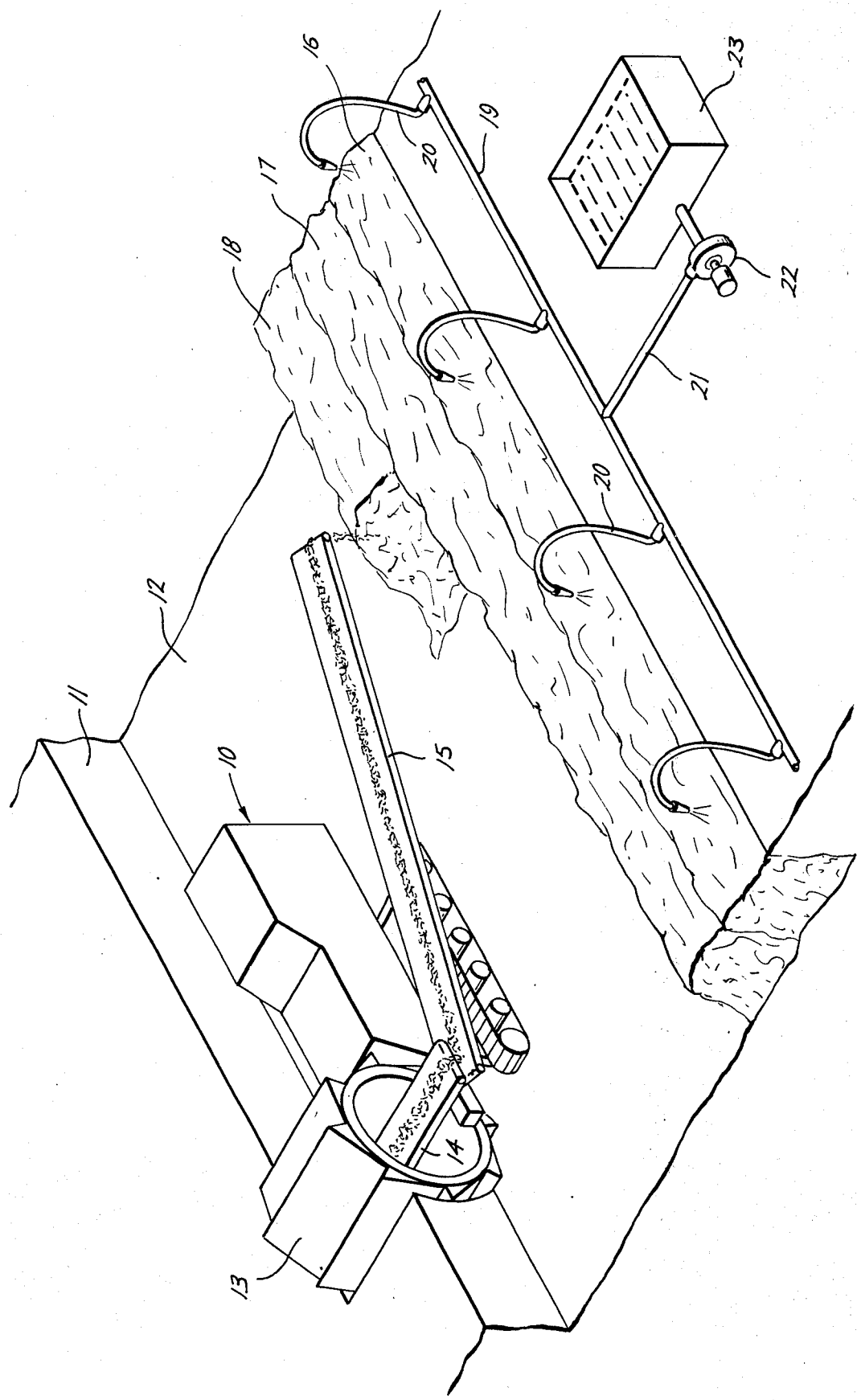

METHOD OF DISPOSING OF LIQUID WASTE

This application is related to my copending application Ser. No. 550,161, filed Feb. 14, 1975, titled "METHOD OF DISPOSING OF LIQUID WASTE".

This invention relates to the disposal of liquid waste in the earth.

The disposal of liquid wastes in large volumes has been a problem and is becoming one of ever increasing dimensions. These liquid wastes comprise relatively dilute aqueous suspensions, or solutions, or both, of solids. Some of these solids may have, when properly used, certain beneficial properties while other tend to have deleterious properties. There are several souces of these large volumes of liquid wastes and, as some of the more prevalent, there may be named the following:

1. Sewage sludge: This liquid waste results from wastewater treatment facilities, commonly municipally owned, and has a suspended solid content typically in the range of 5 to 20 weight percent. This sludge has potential value as a soil fertilizer or beneficiator when properly applied, with one important application being the controlled disposal of the sludge to beneficiate and reclaim barren land for agricultural and recreational purposes. For example, it has been recognized that sewage sludge has the potential of reclaiming land which has been strip mined to return it to beneficial usage. However, despite this recognition there still remains the problem of economically applying large volumes of the sludge to this type of land.

2. Water treatment wastes: Processes presently employed to soften or otherwise improve the properties of natural water result in the generation of substantial volumes of liquid wastes. Many of these wastes consist of aqueous suspensions of insoluble chemicals removed from the water such as magnesium hydroxide and calcium carbonate.

3. Mining and ore beneficiation wastes: One type of such waste is termed a slime which is an aqueous suspension or dispersion of ultrafine solid waste resulting from the beneficiation process.

4. Liquid agricultural waste: Typical of this type of waste is the runoff water from cattle feedlots.

All of the foregoing liquid wastes have the characteristic of being pumpable. The suspended solids content of the aqueous medium is typically in the range of 5 to 20 weight percent. Some of the, especially sewage sludge and mining sludge, are being generated in tremendously large volumes. It has been estimated that an urban community of five and one-half million people will generate approximately seven hundred dry tons of sewage sludge solids per day and this does not include industrial contribution. Translating the seven hundred tons to gallons of liquid waste at twelve percent solids concentration yields about one million four hundred thousand gallons of liquid waste per day or nearly one-half billion gallons per year. Disposal of this enormous volume of liquid waste is a physical problem in itself and when it is considered that such disposal must not only be as economical as possible but also must be accomplished without violating the ever increasingly restrictive ecological laws, the problem becomes enormous.

The current practices for ultimate disposal of liquid wastes of the type herein mentioned include incineration, ocean disposal and land disposed.

Incineration essentially involves drying and subsequent combustion of the organic solids contained in the liquid wastes such as sewage sludge. One advantage of incineration is that the total volume of solids which must be disposed of is substantially reduced, e.g., to about ⅓ of the original. However, the remaining solids are in the form of ash which must still be disposed of at land disposal areas. Currently, the prime disadvantages of incineration is that it requires vast amounts of energy to dry and incinerate the materials and also releases significant quantities of pollutants to the air including volatilized metals.

Ocean disposal provides coastal areas with a convenient dump for waste products but, of course, is not readily available for inland areas. Moreover, any nutrient value in the liquid wastes, such as those of sewage sludge, is wasted while the organic portions present tend to deplete the dissolved oxygen of the seawater.

Land disposal provides the most commonly used and most promising mode for ultimate disposal of liquid wastes. Present practices in land disposal include land fill (containment or sludge lagooning), land spreading and incorporation.

Land fill operations are practiced in many areas, but most generally this type of disposal results in either concentrated dosages of harmful waste in small areas or inefficient or non-existent use of potential nutrient value of some wastes, particularly sewage sludge. Few land fill sites can be used for twenty to thirty years after being filled.

Present techniques used in land spreading generally involve surface application of the waste material, such as by irrigating the surface with the liquid waste or by shallow injection of the liquid waste in conjunction with plowing or ditching operations conducted on the land. The latter operation is typically illustrated in U.S. Pat. No. 3,842,764 to William J. Bauer. While land spreading techniques for disposing of sewage sludge can have certain beneficial effects on soil and can be used to reclaim soil, they are quite expensive and require large tracts of land to handle the large volumes of sewage sludge. More generally stated, one of the chief disadvantages of disposing of liquid wastes by known land fill or spreading techniques is their inability to permit the economical disposal of large volumes of the wastes within a relatively short time and over a relatively small area of the earths's surface.

It is accordingly an object of this invention to provide a method which will permit the disposal of very large quantities of liquid wastes over relatively small land areas within a relatively short time and at a relatively small cost.

Still another object is to provide a method in which liquid wastes, such as sewage sludge, is recycled back into the natural environment to allow natural processes to operate on the disposed materials so that they beneficiate the earth to a very substantial depth therein and thereby provide a deep growing strata which did not exist in the area originally. This is particularly an advantage with respect to deep rooted crops, grasses, trees, etc.

Another object is to provide a method of disposing of liquid waste by incorporating the waste into the earth in a controlled, environmentally acceptable and economical manner.

Another object is to provide a method for readily disposing of liquid wastes using machinery and components which are readily available on the open market.

These and other objects of the invention will become apparent to one skilled in the art upon the consideration of the specification, the claims and the drawing which shows, somewhat schematically, apparatus for practicing the steps of the method.

In accordance with the method of this invention, the surface of the earth is continuously excavated to a substantial depth (at least six feet) from one region and the excavated earth is transported to and deposited at another region. After the earth has been transported from one such region to the other, pumpable liquid waste is deposited on such earth to be absorbed thereby while the deposited earth is still in a relatively unpacked, permeable condition. The preferred mode is to continuously excavate earth from along one side of a trench, transport the so excavated earth to and depositing it at the other side of the trench. Thereafter the liquid waste is deposited on the excavated earth. This operation is preferably conducted so that the width of the trench remains substantially constant. Thus, the lateral width of the earth being deposited at the other side of the trench is controlled to be approximately equal to the width of the excavation being made at the one side of the trench. This may require that the earth deposited at the other side of the trench to extend above the natural undisturbed level of the earth but it will eventually settle and any undesired unevenness can be smoothed out by suitable machinery such as bulldozers or graders. By making repeated passes along the trench while always excavating from along the same side of the trench, the latter is effectively moved laterally thereby permitting the disposal operation to traverse the entire width of a tract of land. This permits utilization of the entire body of land for waste disposal so that a tremendous volume of liquid waste can be disposed of in a relatively small surface area.

One important aspect permitting such large volume disposal is the depth of excavation. This should be greater than the normal tillage depth of argicultural operations and should be greater than about six feet, preferably of the order of about 15 to 30 feet or more. Excavation to these substantial depths will involve large amounts of earth and this permits the disposal of large amounts of waste liquid per acre of land even at relatively low dosage rates. for example, with a dosage rate of 10% of liquid waste per unit weight of soil, 2,000 tons of liquid sewage sludge waste can be disposed of in an area of only 0.7 acre when the depth of excavation is 12 feet. Moreover, in this example, the depth of the soil beneficiated for the production of crops, grasses, etc. is of the order of 12 feet which, in many areas, is 3 to 5 times deeper than the depth normally available for viable root growth.

Referring to the drawing, an excavating mechanism 10 is shown in operation along one side wall 11 of trench 12. The excavation mechanism is of the type which is commonly referred to as a wheel excavator or continuous excavator. There are several commercial manufacturers of this type of equipment at the present time. One type of such excavator is the Continuous Excavator Model WL-50 manufactured by the Barber-Greene company of Aurora, Illinois. Another type is the Model 1000 MX bucket wheel excavator manufactured by Mechanical Excavators, Inc., of Los Angeles, California. These excavators are used in strip mining and commonly have excavation capacities of 1,000 to 2,000 cubic yards per hour at depths ranging from ten to fifteen feet per pass.

The illustrated excavator is equipped with a digging wheel 13 which deposits excavated material onto a transfer belt 14 which in turn deposits the material on a conveyor 15 for discharge at the other side of the trench. In the drawing, there is shown three successive layers 16, 17 and 18 of earth which have been deposited on the side of the trench opposite to that from which the earth has been excavated. Layers 16 and 17 were deposited from previous passes of the excavator along one side of the trench while layer 18 is being formed during the pass illustrated in the drawing.

Means are provided for depositing liquid wastes on the earthen material after it has been deposited and while it is still in a relatively unpacked, loose, permeable condition. Such means is conveniently illustrated as a header 19 equipped with a plurality of applicator hoses 20. Header 19 is connected via a pipe 21 to a pump 22 which takes suction from a tank, pit or other container, here shown as a tank 25.

The above-described excavation of earth greatly increases its gross porosity so that its capacity to absorb liquid wastes is increased as compared with the virgin earth prior to excavation and this may be particularly true at depths greater than six feet. In many instances, virgin soil at these depths will be essentially nonporous and impermeable to liquid flow but by excavating it as above-described, it will be chopped into small lumps or granules. The latter provide a substantial porosity (or voids) in the earth so that large amounts of waste liquids can rapidly flow to the full depth of the excavation to ultimately be absorbed into the lumps or granules.

A desirable characteristic of the wheel type excavators is the milling action, produced by the repetitive cutting action of the buckets. This action tends to chop even stiff soils into small lumps or granules. These small particles result in much soil surface area being exposed where absorption can take place. In any case the waste liquid is deposited on the deposited excavated earth while the porosity thereof is greater than that of the earth prior to its excavation.

The dosage of the soil with the liquid waste can readily be adjusted through a desired value dependent upon a number of factors. For example, when sewage sludge is the liquid waste, the content of nitrogenous materials therein can be readily determined and may be used as a control point to determine the dosage. For example, if the original soil has no or very little nitrogenous material in it and an agronomist wishes to achieve a certain content, the dosage rate can be adjusted to supply the difference. On the other hand, beneficiation of the earth may be incidental to the disposition of large volumes of wastes and in such case, very large dosages can be used.

When the liquid waste contains a deleterious or toxic material which is harmful to plant life or a selected species of vegetation when present in the earth above a certain concentration level, the dosage can be adjusted to maintain the final level in the treated earth below the toxicity level, the latter being well known to agronomists.

The ultimate disposal of the excess water in the soil-liquid waste mixture takes place through the natural process of evaporation and the more efficient mechanism of plant transpiration.

From the foregoing it will be seen that this invention is one well adapted to attain all of the ends and objects hereinabove set forth, together with other advantages which are obvious and which are inherent to the method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. The method is disposing of a pumpable liquid waste comprising the steps of continuously and simultaneously (i) excavating earth to a depth of at least six feet from one region and (ii) transporting it to and depositing it at another region, and depositing liquid waste on the excavated earth after it has been deposited at said another region and while the porosity thereof is greater than that of the earth prior to excavation.

2. The method of claim 1 wherein the liquid waste is pumped from a fixed source to the point where it is deposited as aforesaid.

3. A method of disposing of a pumpable liquid waste comprising the steps of causing an excavator to continuously excavate earth to a depth of at least six feet at one side of a trench and transporting the earth as it is excavated to and depositing it at the other side of the trench, and depositing liquid waste on the excavated earth after it has been deposited at said other side of the trench and while the porosity thereof is greater than that of the earth prior to excavation.

4. The method of claim 3 wherein the trench is made wide enough so that the excavator can travel along the bottom of the trench.

* * * * *